United States Patent [19]

Cheng

[11] Patent Number: 4,650,110
[45] Date of Patent: Mar. 17, 1987

[54] CONTINUOUS MOVEMENT BRAZING PROCESS

[75] Inventor: Wenche W. Cheng, Monroeville, Pa.

[73] Assignee: Westinghouse Electric Corp., Pittsburgh, Pa.

[21] Appl. No.: 790,010

[22] Filed: Oct. 22, 1985

[51] Int. Cl.$^4$ .............................................. B23K 35/24
[52] U.S. Cl. ..................................... 228/242; 228/119
[58] Field of Search ................ 228/242, 215, 232, 119

[56] References Cited

U.S. PATENT DOCUMENTS

3,110,102 11/1963 Pfefferkorn .......................... 228/215
3,767,282 10/1973 Poley et al. .......................... 228/215

Primary Examiner—Nicholas P. Godici
Assistant Examiner—Karen Skillman
Attorney, Agent, or Firm—L. A. DePaul

[57] ABSTRACT

An improved process for brazing a sleeve within a tube is disclosed herein. In the first step of the process, a radial expansion is induced in the tube in a first longitudinal section which does not include the ring of brazing alloy which circumscribes the sleeve. In the second step of the process, the heat source which applies the heat to the tube is gradually translated from a position adjacent to the first longitudinal section of the tube, to a position adjacent to the ring of brazing alloy which circumscribes the sleeve. The resulting thermal expansion which is induced in the length of the tube between the first longitudinal section where the heat source is initially placed, and the ring of brazing alloy avoids the creation of gaps in the resulting braze joint by producing a tapered, stress-absorbing expansion in the tube having a minimum profile in the region where the brazed joint is formed. In the preferred embodiment, the sleeve is circumscribed by a ring of a ceramic stop-off material in order to prevent the melted brazing alloy from spreading itself too thinly along the length of the tube. This process is particularly useful in creating high-quality braze joints in sleeving operations in nuclear steam generators, where the heat exchange tubes which need to be sleeved may be partially or completely prevented from expanding in the longitudinal direction due to sludge deposits within the generator.

28 Claims, 6 Drawing Figures

CONTINUOUS MOVEMENT BRAZING PROCESS

BACKGROUND OF THE INVENTION

1. Field of the Invention

This invention relates to an improved process for brazing reinforcing sleeves within heat exchange tubes which avoids the creation of undesirable gaps in the resulting braze joint.

2. Description of the Prior Art

Processes for brazing sleeves within the heat exchange tubes of nuclear steam generators are known in the prior art. In such processes, a sleeve which is circumscribed by a ring of brazing alloy at one or both ends in slid across a section of the tube whose walls are in need of repair due to corrosion or denting. The end of the tube having the ring of brazing alloy is then typically hydraulically expanded so that it snugly engages the inner walls of the tube. In order to create a watertight seal between the sleeve and the interior walls of the tube, a brazing heat is applied across the expanded end of the tube. The brazing alloy melts, and forms a water-tight braze joint between the sleeve and the interior walls of the tube. Such sleeving operations are often performed across the longitudinal sections of the heat exchange tubes which extend through the openings of the tubesheet and support plates of the nuclear steam generator due to the tendency of the walls of these tubes to corrode and dent in these regions.

While the aforementioned one-step brazing process frequently results in water-tight braze joints, problems may arise when sludge deposits become tightly wedged in the annular space between the walls of these tubes and the bores or other openings in the tubesheets and support plates through which these tubes extend. Under such circumstances, the sludge deposits may bind the outer walls of the tubes so tightly against the walls of the bores in the tubesheets and support plates that the tubes are prevented from expanding longitudinally when the brazing heat is applied to the tube and sleeve. Consequently, these tubes will expand radially instead of longitudinally in the area where the brazing heat is applied. Such a radial expansion in the area of the braze joint creates undesirable gaps in the joint which may seriously jeopardize the integrity of the water-tight seal the braze joint is intended to produce. Of course the extent to which such undesirable gapping occurs varies widely between any group of sleeve tubes due to the varying amount of binding forces the sludge deposits surrounding these tubes apply when a brazing heat causes them to expand. However, in those tubes where the sludge deposits apply a substantial amount of resistance to longitudinal tube expansions, the amount of gapping which occurs will, at the very least, significantly jeopardize the ability of the braze joint to create the intended water-tight seal.

In order to overcome the gapping problem associated with such one-step brazing processes, a two-step brazing process was developed. This process is fully described and claimed in U.S. patent application Ser. No. 634,336, filed July 25, 1984 by John Driggers and assigned to the Westinghouse Electric Corporation. In this process, heat is applied across a longitudinal section of the tube which does not include the brazing region of the sleeve in order to thermally create a radial expansion in this first section of the tube. Next, a brazing heat is applied across a second section of the tube which surrounds the brazing region of the sleeve in order to braze the sleeve into the tube. The tensile stresses generated in the tube by the first heating step tend to balance out any radial expansion that the tube undergoes at the site of the brazed joint, and greatly reduces gaps between the sleeve and the tube in the braze joint.

While this two-step brazing process represents a substantial advancement in the art, it unfortunately does not solve all of the gapping problems which may occur between sleeves and tubes in the sludge-locked tubes which are often present within nuclear steam generators. Despite the fact that a stress-absorbing bulge or radial expansion is induced in the tube near the vicinity of the brazing region between the tube and the sleeve, a smaller, but still significant gap-producing bulge can occur around the vicinity of the ring of brazing alloy as a result of the application of a brazing heat thereto. The resulting gap can cause the liquified brazing alloy to flow too far along the longitudinal axis of the tube in the small annular space between the tube and the sleeve, thereby thinning out the brazing material to an extent which sometimes results in a non-watertight braze joint. The problem is particularly acute where it is desired to braze a reinforcing sleeve across a section of tubing which has been corroded in the region around a support plate in the steam generator, because the lower ends of such reinforcing sleeve must be brazed to complete the sleeving operation. In such lower braze joints, an upward flow of brazing material (caused by capillary forces) is highly desirable. However, even a small gap between the sleeve and the tube can weaken the capillary forces to such an extent that gravity causes the melted brazing material to flow downwardly, away from the desired brazing region. While the small gap produced around the lower brazing region might be reduced by inducing a second radial expansion at another location close to, but not including the ring of brazing alloy, the resulting process would consume an inordinate amount of time, and would not always produce the desired braze joint.

Accordingly, there is a need for a brazing process which is capable of reliably providing a water-tight braze joint between a sleeve and a tube in a heat exchanger with a minimum amount of time. Moreover, it would be desirable if this process could be easily implemented with existing brazing heaters.

SUMMARY OF THE INVENTION

In its broadest sense, the invention is an improved process for creating a reduced-gap braze joint between a conduit such as a tube, and a sleeve concentrically disposed within the tube, wherein the tube is prevented from expanding longitudinally when a brazing heat is applied thereto. In the first step of the process, heat from a translatable heat source is applied across a first longitudinal section of the tube which does not include the brazing region of the sleeve in order to thermally induce a radial expansion in this section of the tube. Next, the heat source is gradually translated toward the brazing region of the sleeve in order to thermally expand the length of the tube between the first longitudinal section, and the brazing region. Finally, heat from the heat source is applied onto the brazing region in order to melt the brazing material disposed therein, and to braze the sleeve to the tube. The tensile stresses generated in the tube by the thermal expansion induced across the entire brazing region tend to balance out any radial expansion the tube undergoes along the brazing region, thereby eliminating gaps between the sleeve and tube in the resulting braze joint. This process is an improved method for eliminating the gaps which sometimes occur when reinforcing sleeves are brazed within tubes in steam generators which are bound or "locked" between tubesheets or support plates by sludge deposits.

In the preferred process of the invention, the heat source is continuously translated at a constant speed between the first longitudinal section of the tube and the brazing region so that the heat source thermally induces some radial expansion at every point along the aforesaid tube length, but at a decreasing amount as the heat source is moved toward the brazing region of the sleeve. Additionally, the sleeve is preferably circumscribed by a stop-off material for limiting the longitudinal extent to which the liquified brazing material may flow so that it does not excessively thin itself out in the brazing region. When such a ring of stop-off material is used in the sleeve, the heat that the heat source applies forms a uniform layer of fused brazing material in the brazing region defined between the center of the brazing reservoir of the sleeve, and the opposing edge of the stop-off material.

When the tube and the sleeve are formed from a nickel-based alloy such as Inconel, the heat source may be applied across the first longitudinal section of tube until it obtains a temperature of about 1800° F. or greater. The brazing reservoir of the sleeve contains a brazing material which is preferably in the form of a ring-shaped deposit of particles of a brazing alloy which have been bound to the outer surface of the sleeve by an acrylic-based binder. Additionally, the edge of the brazing region which is opposite the edge of the ring of stop-off material may be glazed, or partially fused onto the surface of the sleeve. The distance between the edge of this ring of glazed flux and the opposing edge of stop-off material may be anywhere between one quarter and one half of an inch, but is preferably about three eighths of an inch. Finally, the opposing edges between the first longitudinal section of the tube to be heated, and the ring of glazed brazing material may be between one and two inches.

In the preferred embodiment, the heat source is translated at a rate of between one half inch and one inch per minute after a radial expansion along the first longitudinal section of the tube has been thermally induced. Additionally, when both the tube and the sleeve are substantially vertically oriented, the uppermost brazed joint is formed by initially applying heat across a first longitudinal section of the tube which is below the upper brazing region of the sleeve, while the bottom braze joint is formed by initially applying heat across a first longitudinal section of the tube which is above the lower brazing region of the sleeve. The formation of the lower braze joint by the gradual application of heat from a position above it is important, since the pre-heating of the section of the tube immediately above the ring of brazing material helps maintain the liquidity of the brazing material so that it can flow upwardly against the force of gravity in a uniformly distributed pattern between the tube and the sleeve as a result of capillary forces.

The improved process of the invention is capable of producing braze joints between sleeves and tubes characterized by little or no gapping in the vicinity of the resulting brazed joint, regardless of the extent to which sludge deposits or denting has bound tubes in the bores of the tubesheets or support plates. This process is also well-suited for producing braze joints and tubes which are either free from binding, or are only slightly bound, and has resulted in joints of improved consistency in these tubes.

DETAILED DESCRIPTION OF THE PREFERRED EMBODIMENT

Purpose and Implementation of the Improved Process

Figures 1A, 1B:
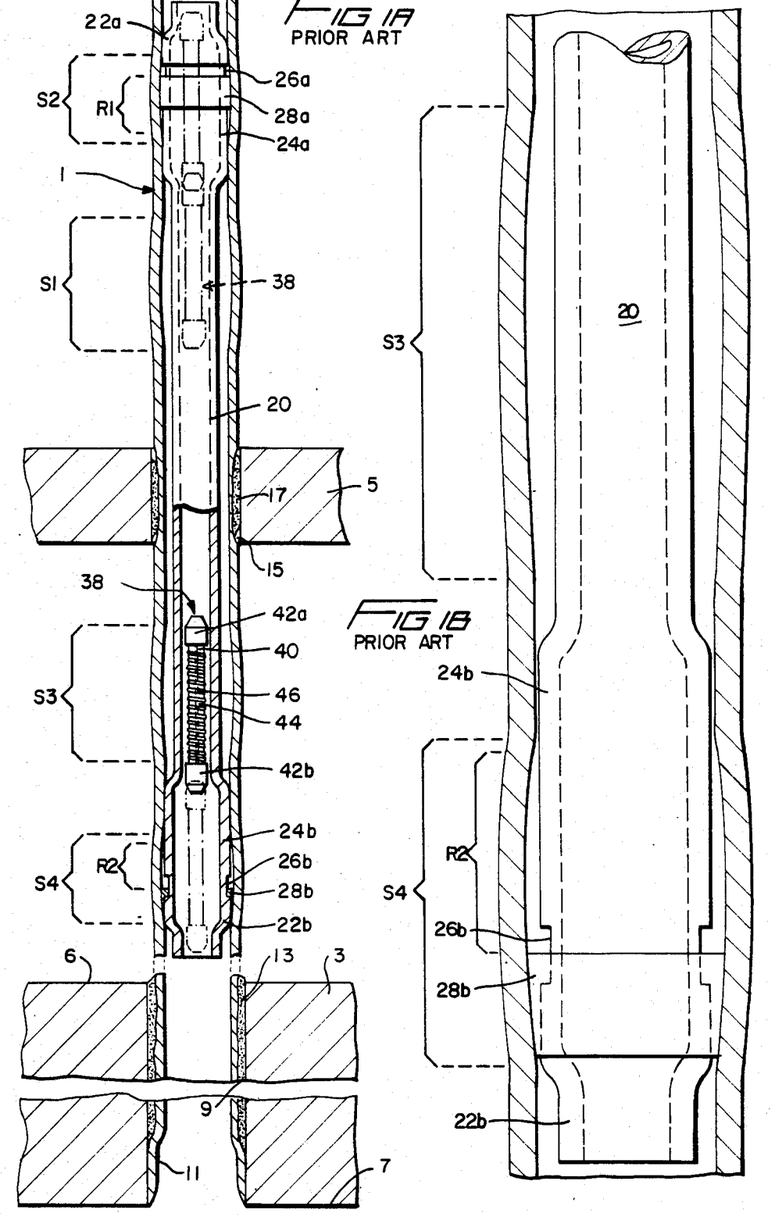
FIG. 1A is a partial cross-sectional view of what can happen to a sleeve which has been brazed across a section of a heat exchange tube in a tubebound situation by means of the previously described, two-step prior art brazing process.
FIG. 1B is a detailed, cross-sectional view of the lower braze joint between the sleeve and the bound tube illustrated in FIG. 1A.

With reference now to the several figures, wherein like numerals represent like parts, FIGS. 1A and 1B represent how the previously discussed, two-step prior art brazing process can create an undesirable gap in the braze joint between a heat exchange tube 1 in a nuclear steam generator, and a reinforcing sleeve 20. To fully understand why this two-step brazing process can create such gaps, some background concerning the structure and maintenance problems associated with nuclear steam generators is necessary.

Nuclear steam generators generally include a primary side through which hot, radioactive water from the reactor core is admitted into a plurality of heat exchange tubes 1, which may be either U-shaped or straight. Such steam generators further include a secondary side which houses and spaces these tubes 1 and circulates a flow of non-radioactive water therebetween so that non-radioactive steam may be generated from the heat output of the reactor core. A tubesheet 3 separates the primary side of the nuclear steam generator from the secondary side of the generator. Additionally, a plurality of support plates 5, each of which includes a plurality of bores through which the heat exchange tubes 1 extend, space these tubes 1 from one another and provide lateral support for them.

In FIG. 1A, the bottom surface 7 of the tubesheet 3 faces the primary side of the steam generator, while the top surface 6 faces the secondary side. Like the previously mentioned support plate 5, the tubesheet 3 includes an array of bores 9 through which the heat exchange tubes 1 extend. The mouths 11 of these tubes 1 are substantially flush with the bottom surface 7 of the tubesheet 3 which faces the primary side of the nuclear steam generator. Furthermore, the outer walls of each of the mouths 11 of the tubes 1 are expanded so that they flare out and engage the mouths of their respective bores as shown. The mouths 11 of each of the tubes 1 are also welded to their respective bores 9 to secure the tube 1 into the tubesheet 3, as well as to form a water-tight seal between the tube 1 and its repsective tubesheet bore 9. However, past its flared mouth 11, the tube 1 often extends through the remainder of the tubesheet bore 9 with some amount of annular space between the outer surface of the tube 1, and the surface of the bore 9. Additionally, some amount of annular space often exists between the tube 1 and the bores 15 of the support plates 5. In both instances, the bores 9 and 15 of the tubesheet 3 and support plates 5 are deliberately manufactured with a little larger diameter than the tubes 1 which they accommodate so that the tubes 1 may be easily slid through the tubesheet 3 and the support plates 5 during the manufacture of the steam generator.

Over a period of time, corrosive sludge deposits 13 any 17 may begin to accumulate in the annular spaces between the outer surface of the tube 1 and the bores 9 and 15 in the tubesheet 3 and support plates 5, respectively. These deposits may ultimately cause some corrosion in the outer walls of the tube 1, thereby making the outer surface of the tube 1 rough and weakened in these regions. Such corrosion may be exacerbated if the tube 1 vibrates against the walls of the bore 15 in the support plate 5, which can occur due to laterally oriented water currents present in the secondary side of the steam generator. Such vibration of the tube 1 may actually dent the outside section of the tube 1 surrounded by the bores 15 of the support plates 5. The weakening of the walls of the tube 1 from the corrosion degradation caused by the sludge deposits 13 and 17 around the bores 9 and 15 and the dents in the tube 1 in the region of the support plate bores 15 may crack the tube 1 and lead to a leak condition which could radioactively contaminate the non-radioactive water flowing around the outside surface of the tube 1 on the secondary side of the generator.

To prevent such a leak condition from occurring, sleeves 20 are installed within the tube 1 across the weakened areas of the tube 1. When such a sleeve 20 is used to repair the region of the tube 1 adjacent to the bore 15 of a support plate 5, the sleeve 20 typically includes both a distal or top end 22a, and a proximal or bottom end 22b, each of which include sections 24a and 24b which have been hydraulically expanded into contact with the inner walls of the tube 1 by means of a hydraulic expansion unit. Such a sleeve 20 further includes upper and lower brazing reservoirs 26a, 26b, around which an annular ring of brazing alloy 28a, 28b is situated. To complete the sleeving process, the expanded sections 24a and 24b of the sleeve 20 are sequentially brazed against the inner walls of the tube 1 by means of a heat source in the form of a radiant tube heater 38 which melts the brazing alloy 28a, 28b in the upper and lower expanded sections 24a, 24b of the sleeve 20. For a more complete description of tube sleeving processes in general, reference is made to U.S. patent application Ser. No. 567,107, filed Dec. 30, 1983, and assigned to the Westinghouse Electric Corporation, the entire specification of which is expressly incorporated herein. Although not specifically shown in FIGS. 1A and 1B, it should be noted that the region of the tube 1 surrounded by the tubesheet 3 may also be repaired by sleeving. However, the sleeves used to repair the section of the tube 1 surrounded by the bore 9 of the tubesheet 3 include a brazing reservoir only at their upper ends, their bottom ends being mechanically expanded and rolled againt the mouth 11 of the tube 11 to effect the desired water-tight seal between the sleeve 20 and the tube 1.

Unfortunately, the sludge deposits 13 and 17 around the bores 9 and 15 of the tubesheet 3 and support plates 5 can interfere with the production of a uniform, leak-proof braze joint between the expanded sections 24a, 24b of the sleeve 20 and the inner walls of the tube 1. Such interference arises from the fact that the sludge deposits 13 and 17 tend to lock the tubes 1 so tightly in place against longitudinal movement that the tube 1 is prevented from longitudinally expanding when a brazng heat is applied across the reservoirs 26a, 26b in the upper and lower expanded sections 24a, 24b of the sleeve 20. Consequently, the brazing heat will cause these longitudinal sections of the tube 1 to expand radially. Such thermally induced radial expansions create gaps between the walls of the expanded sections 24a, 24b of the sleeve 20 and the inner walls of the tube 1. In some cases, this gap is so large that the brazing alloy 28a, 28b will completely spill out of the space between the expanded sections 24a, 24b of the sleeve 20 and the inner walls of the tube 1, thereby failing to create a braze joint between the sleeve 20 and the tube 1.

FIGS. 1A and 1B illustrate the two-step, prior art brazing process which was developed to eliminate or at least reduce the chances of a thermally induced, radial expansion in the tube in the vicinity of the brazing reservoirs 26a, 26b from interfering with the production of a high-quality, water-tight braze joint between the sleeve 20 and the tube 1. Generally speaking, this prior art process reduced such joint-impairing gaps by thermally expanding sections S1 and S3 of the tube 1 by means of a radiant heat source 38 before proceeding to apply a brazing heat across the sections S2 and S4 of the sleeve/tube combination which included the brazing reservoirs 26a, 26b of the sleeve 20. In the preferred embodiment of this process, an upper braze joint between the upper expanded portion 24a of the sleeve 20 and the tube 1 was first created by initially positioning a radiant heat source 38 adjacent to a selected longitudinal section S1 of the tube 1 which was far enough below the upper brazing reservoir 26a of the sleeve 20 so that it did not overlap it. The radiant heater 38 was then actuated in this position for a long enough time to thermally induce a radial expansion in the longitudinal section S1. As soon as this first radial expansion was completed, the radiant heater 38 was slid upwardly into a position immediately adjacent a longitudinal section S2 of the sleeve/tube combination which encompassed a desired brazing region R1 between the sleeve 20 and the tube 1. as is indicated in FIG. 1A, brazing region R1 generally encompasses a span from about the center of the upper brazing reservoir 26a, to a point somewhere on the lower end of the expanded upper section 24a of the sleeve 20. When the radiant heater 38 was thus positioned, two events occurred. First, the upper brazing alloy 26a melted as expected, and began to flow downwardly in the small annular space between the sleeve 1, and the expanded upper section 24a of the sleeve 20. Secondly, it has been discovered that the radiant heater 38 induced a second, smaller thermal expansion (or bulge) in the tube 1 in the longitudinal section S2.

Where upper-end braze joints are concerned, the creation of a second, smaller radial expansion of the tube 1 in the vicinity of the brazing region usually interferes little with the creation of a high-quality, watertight braze joint between the upper expanded section 24a of the sleeve 20, and the surrounding tube 1. However, this second, smaller radial expansion of the tube 1 can create problems when this two-step process is used to braze the lower end 22b of the sleeve 20 to the tube 1. This problem may best be appreciated with reference to FIG. 1B. When the lower braze joint is created by way of the two-step brazing process, longitudinal section S3 is first heated in order to thermally induce a radial expansion in this section of the tube 1 as shown. As soon as this is accomplished, the radiant heater 38 is quickly slid down so that its heatng coil 46 is adjacent to section S4, which encompasses the desired brazing region R2. In order for the brazing alloy 28b to flow into the small, annular space (which is greatly exaggerated in FIG. 1B) between the sleeve 20 and the tube 1 in this region, capillary forces must overcome the forces of gravity in order to draw the liquified, lower brazing alloy 28a out of the lower brazing reservoir 26b and up to the upper limit of the desired brazing region R2. Unfortunately, even a small thermally induced gap in the longituidnal section of the tube 1 encompassed by the desired brazing region R2 can substantially reduce the capillary forces which normally would overcome the gravitational force acting upon the liquefied brazing alloy in this region, and cause this alloy to flow downwardly into the position illustrated in FIG. 1B. The end result is that the creation of a high-quality braze joint between the lower end 22b of the sleeve 20 and the tube 1 is, at the very least, jeopardized as the lower brazing alloy 28b assumes the position illustrated in FIG. 1B. At worst, if the thermally induced gap between the tube and the sleeve around the desired brazing region R2 is large enough, the liquefied brazing material 28b can flow completely out of the small annular space between the expanded lower section 24b and the tube 1, whereby no braze joint at all would be created.

Figures 2A, 2B:
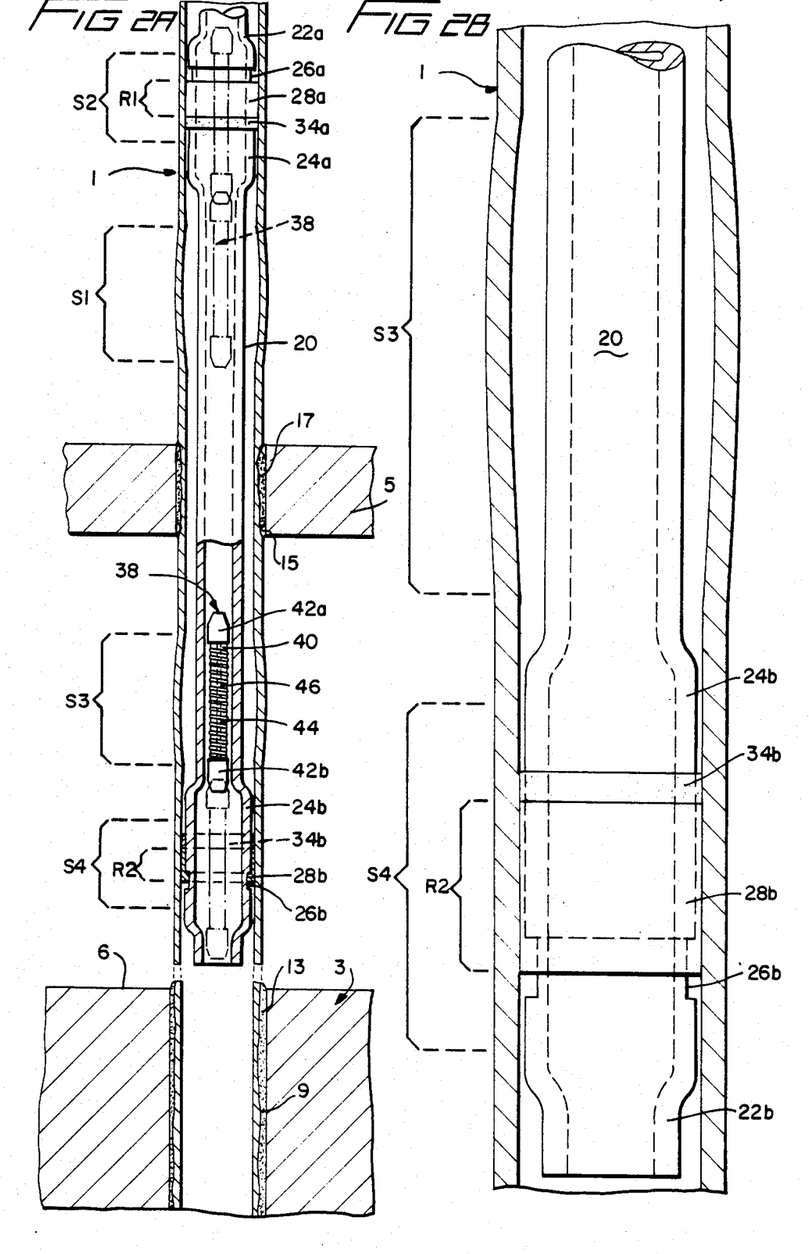
FIG. 2A is a partial cross-sectional view of a sleeve which has been brazed across a section of a heat exchange tube by the improved process of the invention.
FIG. 2B is a detailed, cross-sectional view of the braze joint between the lower end of the sleeve and the tube illustrated in FIG. 2A.

FIGS. 2A and 2B illustrate how the improved, multi- or continuous-step brazing process of the invention eliminates the creation of a second thermally induced gap in the lower razing region R2 of the sleeve/tube combination. Basically, the improved process accomplishes this result by gradually moving the radiant heater 38 from a section S1 or S2 of the tube 1 which is adjacent to, but which does not include, the brazing region R1 or R2 of the joint to be created. The gradual movement of the radiant heater 38 from an adjacent position to a position adjacent to the brazing reservoir of the upper or lower end of the sleeve 20 eliminates or at least minimizes the creation of any annular gap in the desired brazing region of the tube/sleeve combination. Additionally, the improved process of the invention utilizes a sleeve 20 which is circumscribed by a ring 34a, 34b of ceramic stop-off material located below the upper brazing reservoir 27a, and above the lower brazing reservoir 27b, respectively. The rings 34a, 34b of stop-off material limit the extent to which the liquified brazing alloy flowing out of the upper and lower brazing reservoirs 26a, 26b can flow along the length of the sleeve 20, and assist in forming a uniform layer of brazing alloy around the small annular gap between the sleeve 20 and the tube 1 in both the upper and the lower brazing regions R1 and R2. The end result of the improved process of the invention is that a high-quality, water-tight braze joint is created between the sleeve 20 and the tube 1, regardless of the extent to which the tubes 1 may be prevented from longitudinal movement due to sludge deposits 13, 17, and regardless of whether the sleeve 20 is being installed across a tubesheet 3, or a support plate 5 within the secondary side of the nuclear steam generator.

In all cases, the radiant heat source 38 used preferably includes a mandrel 40 having upper and lower enlarged end portions 42a, 42b and a central portion 44 over which the previously mentioned electrical resistance coil 46 is wound. The enlarged end portions 42a, 42b not only help concentrically center the coil 46 from the interior wall of the sleeve 20, but also serve to sharply define an upper and lower limit to the pattern of heat emanated by the coil 46. The end result of these structural features is that the radiant heat source 38 will apply a fairly uniform and well-defined pattern of radiant heat across the longitudinal section of the sleeve 20 or the tube 1 which it is placed adjacent to. Further, it should be noted that the radiant heat source 38 further includes means (not shown) for slidably positioning the mandrel 40 adjacent to a selected longitudinal section of either the sleeve 20, or the tube 1. In the preferred embodiment, radiant heat sources such as those described and claimed in co-pending Westinghouse Electric patent cases Ser. Nos. 720,106, 720,105, and 720,107, each of which was filed Apr. 4, 1985 (the entire specifications of which are incorporated herein by reference) are used to implement the process of the invention.

SPECIFIC DESCRIPTION OF THE PREFERRED EMBODIMENT OF THE INVENTED PROCESS

FIGS. 2A and 2B illustrate how the radiant heat source 38 may be used to implement the process of the invention. In the first step of the preferred process, the longitudinal center of the coil 46 is positioned adjacent to section S1 of the tube 1, which is between about $1\frac{1}{2}$ and $2\frac{1}{2}$ inches below the upper limit of the desired brazing region R1. The coil 46 of the heat source 38 is then connected to a source of electric power so that it generates radiant heat. Sufficient electrical power is passed through the coil 46 to heat the longitudinal section S1 of the tube 1 and the sleeve 20 which surrounds the radiant heat source 38 to a temperature of between about 1800° F. and 2100° F. The desired temperature should be obtained in from one to four minutes, depending upon the power capacity of the radiant heat source 38. Because the tube 1 is locked into place along its longitudinal axis by the sludge deposits 13 and 17 between the tube 1 and the walls of the bores 9 and 15, the tube 1 will expand radially instead of longitudinally in the section S1 which surrounds the heat source 38.

After the radiant heat source 38 has thermally induced a radial expansion of the tube 1 as shown in FIG. 2A, the heat source 38 is next gradually moved from its position across section S1 to a new position at a speed of between about $\frac{3}{8}$ inch to one inch per minute. In this speed range, the radiant heater 38 will arrive into a position adjacent section R1 in between about two and three minutes. In the preferred embodiment, such movement is made at a constant speed. However, the translation of the heat source 38 may also be made in small, discrete steps of $\frac{1}{4}$ inch per twenty seconds, so that the average speed of the radiant heat source 38 between its positions across from S1 and S2 is about $\frac{3}{4}$ inch per minute. The movement of the heat source 38 in small, discrete steps of about $\frac{1}{4}$ inch per every 20 seconds has the advantage of being easier for the system operator to perform manually than a continuous slow movement of the heat source 38.

Figure 3:
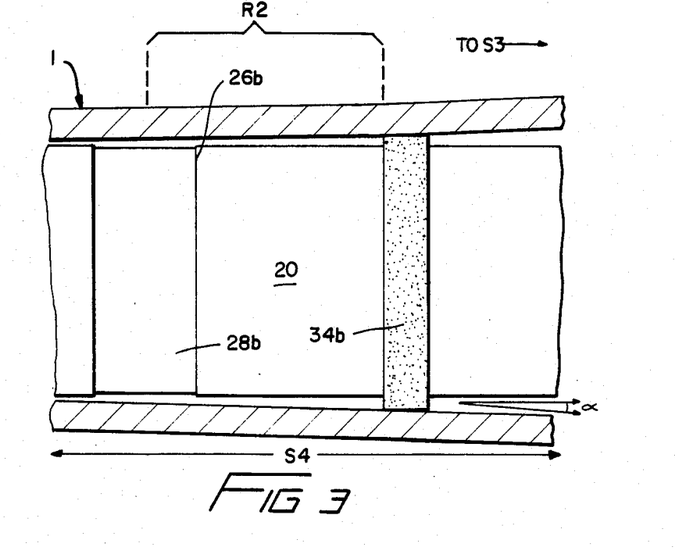
FIG. 3 is an enlarged view of the braze joint illustrated in FIG. 2A immediately prior to the fusing of the brazing alloy.
Figure 4:
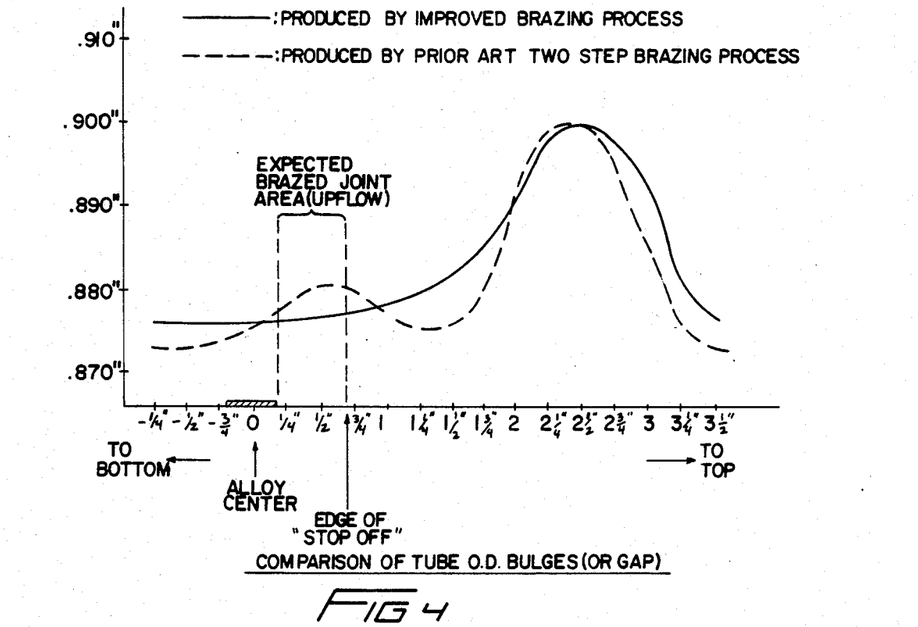
FIG. 4 is a graph which illustrates how the outer diameter of the tube varies along the length of the braze joint for both the prior-art, two-step brazing process, and the improved brazing process of the invention.

Electrical power is continuously applied across the coil 46 of the heat source 38 as it is gradually moved across from S1 to its new position across from S2 of the tube 1. The continuous application of such heat across the length of the tube 1 from S1 to S2 has the effect of thermally inducing at least some degree of radial expansion across this length of the tube 1. However, as may best be seen with respect to FIGS. 3 and 4, the resulting radial expansion in the tube 1 gradually diminishes as the heat source 38 is translated closer and closer toward its final position across from S2. The end result is that the inner surface of the tube 1 thermally recedes only a very small distance from the outer surface of the sleeve 20 in the vicinity of R2 so that the resulting gap in this region is insignificant. FIG. 4 best illutrates how the diminishing radial expansion created by the heat source 38 terminates in a very shallow "tapered" portion at the outer edge of the stop-off material 34a. This small distance between the inner and outer walls of the sleeve 20 and the tube 1 remains intact by the time the heat source 38 fuses the upper brazing alloy 28a into liquid form, thereby allowing the dual forces of capillary action and gravity to draw a flow of liquified brazing alloy into a uniformly thick band between the midpoint of the upper brazing reservoir 26a, and the inner edge of the stop-off material 34a. Consequently, a uniform, water-tight braze joint of high quality is created between the top end 22a of the sleeve 20 and the tube 1.

After the upper braze joint has been created, the heat source 38 is slid to a position adjacent section S3 of the tube 1, the center of which is located between about 1 to 1½ inches above the upper limit of the desired brazing region R2. The heat source 38 is again held in this position for a period of between one to four minutes, in order that the tube 1 may be heated to a temperature of between 1800° F. to 2100° F. The application of this heat results in a radial expansion or "bulge" in the tube 1 in this region, as may best be seen with respect to FIG. 2B. After this is accomplished, the heat source 38 is again gradually moved from its position across from section S3 of the tube, to a new position across from section S4 of the tube, which includes brazing region R2. The preferred speed is again between ⅝ inch and one inch per minute, again preferably implemented by moving the heat source at a constant speed. The gradual movement of the radiant heater 38 again results in some degree of thermal radial expansion in the tube in the length of the tube between sections S3 and S4. However, as was the case with the creation of the upper braze joint, this gradual movement of the radiant heater 38 from a position across section S3 of the tube 1 to a new position across S4 creates a thermal radial expansion which gradualy tapers into a very shallow expansion across the region R2 (see angle α in FIG. 3). The resulting small gap induced in the brazing region R2 is too small to prevent an upflow of the liquefied brazing alloy 28b due to capillary forces in this region. Accordingly, a uniform layer of brazing alloy is deposited between the midpoint of the lower reservoir 26b, and the lower edge of the stop-off material 34b. The end result is a uniform, waterproof braze joint of high quality between the lower end 22b of the sleeve 20 and the inner walls of the tube 1.

The improvement in the reduction of the gap between the outer wall of the sleeve 20 and the inner wall of the tube 1 which the improved process provides is illustrated in FIG. 4. In this graph, the dotted line represents the length of the gap between the inner walls of the sleeve 20 and the tube 1 when the previously described, two-step prior art brazing process is used. By contrast, the solid line discloses the length of this gap in the regions R1 and R2 when the improved, continuous-step process of the invention is used. An improvement of between 1 and 2½ one-thousandths of an inch in the brazing regions is clearly evident.

While the heat source 38 is initially placed below brazing region R1 and above brazing region R2 in the preferred process of the invention, the process would also be operative if the heat source 38 were initially placed above region R1 and below region R2 in the formation of the upper and lower braze joints. Additionally, the process of the invention may be used to produce a proper braze joint between the sleeve 20 and the tube 1 regardless of whether the tube 1 is completely or only partially frozen from axial movement due to the accumulation of sludge deposits 13 and 17 in the annular recesses between the tube 1 and the bores 9 and 15 of the tubesheet 3 and the support plates 5. The process will also be operable when the tube 1 is freely movable in the longitudinal direction between the bores 9 and 15. Finally, experience has shown that the extent of flow and consistency of both the upper and the lower braze joints resulting from the continuous-positioning heating process is improved even for freely and for partially movable tubes, as compared to braze joints obtained from two-position heating, due to the role that the ring of stop-off material 34a, 34b provides in preventing any runaway flows of brazing alloy.

While the continuous-movement brazing process is applicable to any sleeve and tube combination wherein a ring of brazing material is disposed therebetween, sleeves utilizing partially fused brazing alloys and ceramic flux bands as described and claimed in U.S. patent application Ser. No. 686,941, filed Dec. 27, 1984 and assigned to the Westinghouse Electric Corporation (the entire specification of which is hereby incorporated by reference) are preferred due to the ability of the brazing alloys and ceramic stop-off materials to resist being rubbed off when the sleeves 20 are slid into their proper positions within heat exchange tubes 1.

I claim:

1. An improved process for brazing a sleeve within a conduit by means of a heat source which is capable of applying a pattern of heat across a selected longitudinal section of the conduit, wherein said sleeve has a brazing region which includes a brazing material, comprising the steps of heating a first longitudinal section of the conduit which does not include the brazing region of the sleeve in order to thermally expand the conduit in this section, gradually moving the pattern of heat toward the brazing material in order to thermally induce a pattern of radial expansion throughout every point on the length of the conduit between the first longitudinal section and the opposing edge of the brazing material, as well as to pre-heat the brazing region, and applying said heat pattern onto said brazing material so that said material melts and flows by capillary action through a gap between said conduit and said sleeve in the brazing region, wherein the pattern of radial expansion induced in the conduit causes the gap to be diminished at every point between the first longitudinal section and the opposing edge of the brazing material.

2. A process for brazing a sleeve within a conduit as defined in claim 1, further including the step of ceasing the application of any further heat to the sleeve as soon as the sleeve becomes brazed to the conduit.

3. A process for brazing a sleeve within a conduit as defined in claim 1, wherein said brazing region includes a ring of a fusible brazing material.

4. A process for brazing a sleeve within a conduit as defined in claim 3, wherein said sleeve further includes means for stopping the flow of brazing material which is positioned at some point between the opposing edges of said ring of brazing material and said first longitudinal section, and which defines one edge of the brazing region.

5. A process for brazing a sleeve within a conduit as defined in claim 4, wherein said means for stopping the flow of brazing material includes a ring of stop-off material which circumscribes said sleeve at some point between said opposing edges of said brazing material and said first longitudinal section.

6. A process for brazing a sleeve within a conduit as defined in claim 1, wherein said heat source is a radiant heater which is translatable along the interior of the sleeve.

7. A process for brazing a sleeve within a conduit as defined in claim 3, wherein said brazing material is a brazing alloy.

8. A process for brazing a sleeve within a conduit as defined in claim 1, wherein said conduit is a tube.

9. A process for brazing a sleeve within a conduit as defined in claim 5, wherein the edge of said stop-off material is positioned about one half inch from the opposing edge of said ring of brazing material, and said heater is translated along said length of conduit at a rate of about three quarters inch per minute.

10. A process for brazing a sleeve within a conduit as defined in claim 9, wherein the opposing edge of said first longitudinal section is about three quarters inch from said edge of said brazing region.

11. An improved process for brazing a sleeve within a tube by means of a heat source which is insertable within said sleeve and translatable along the longitudinal axes of said tube and said sleeve, wherein said sleeve includes a brazing region circumscribed by a ring of brazing material, comprising the sequential steps of:
    (a) positioning the heat source adjacent to a first longitudinal section of the tube which does not include the brazing region for a selected amount of time in order to thermally induce a radial expansion in said first longitudinal section of the tube;
    (b) translating the heat source at a substantially uniform rate along the length of tube in order to heat the tube between the first longitudinal section and the ring of brazing material, the rate of translation being such that said heat source thermally induces at least some radial expansion at every point along said tube length and causes a gap between said conduit and said sleeve to attain a maximum expansion in the vicinity of the first longitudinal section, but diminishing at every point in the direction of the brazing region, where a minimum amount of expansion is attained, and
    (c) melting the ring of brazing material so that most of the brazing material flows onto the heated brazing region of said sleeve.

12. A process for brazing a sleeve within a tube as defined in claim 11, wherein the sleeve includes means for stopping the flow of brazing material at a point along said length of the tube between the opposing edges of the ring of brazing material, and said first longitudinal section of said tube, and wherein said means defines one limit of the brazing region.

13. A process for brazing a sleeve within a tube as defined in claim 12, wherein said means is a ring of heat resistant material which circumscribes the tube between the opposing edges of the ring of brazing material and said first longitudinal section of the tube.

14. A process for brazing a sleeve within a tube as defined in claim 13, wherein said ring of heat resistant material is formed from particles of a refractory material.

15. A process for brazing a sleeve within a tube as defined in claim 11, wherein said brazing material flows between an annular space present between the sleeve and the tube by capillary action.

16. A process for brazing a sleeve within a tube as defined in claim 11, wherein said first longitudinal section of said tube is between about one to one and one half inches, and wherein the distance between the opposing edges of the first longitudinal section and the ring of brazing material is between about one and two inches.

17. A process for brazing a sleeve within a tube as defined in claim 16, wherein said heat source is initially positioned adjacent to said first longitudinal section of said tube for between about one and one half to four and one half mintues, and then translated toward the ring of brazing material at a speed of between about one half to one inch per minute.

18. A process for brazing a sleeve within a tube as defined in claim 11, wherein said tube is formed from stainless steel, and wherein said heat source is initially posiitoned adjacent said first longitudal section long enough to heat said section to at least 1800° F.

19. A process for brazing a sleeve within a tube as defined in claim 18, wherein said tube is formed from Inconel, and wherein said heat source is initially positioned adjacent said first longitudinal section long enough to heat said section to between about 1800° to 2100° F.

20. A process for brazing a sleeve within a tube as defined in claim 13, wherein the opposing edges between the ring of brazing material and the ring of heat resistant material which define at least part of the brazing region are between about three eighths to three quarters of an inch apart.

21. An improved process for brazing a metallic sleeve within a metallic tube by means of a heat source which is insertable within the sleeve and translatable along the longitudinal axis of said tube and said sleeve, wherein said sleeve includes a brazing region which is defined on one side by a ring of brazing material, and on the other side by a ring of heat resistant material which is longitudinally positioned a selected distance away from the edge of the ring of brazing material which prevents the brazing material from flowing a certain limit along the axis of the tube when said heat source melts said brazing material, comprising the steps of:
    (a) positioning the heat source in the tube so that it heats a first longitudinal section of the tube which is located a selected distance opposite the edge of the ring of heat resistant material which is furthest away from the ring of brazing material in order to thermally induce a radial expansion in said first longitudinal section of the tube;
    (b) translating the heat source at a substantially uniform rate along the length of the tube between the first longitudinal section and the ring of brazing material, wherein said rate of translation is chosen so that the heat source preheats said brazing region, and thermally induces at least some radial expansion at every point along said length of tube, but wherein the amount of radial expansion decreases at every point along said length of tube as the heat source approaches the ring of brazing material, and (c) melting the ring of brazing material causes a gap between said conduit and said sleeve to be diminished at every point between the first longitudinal section and the opposing edge of the brazing region, and so that said material uniformly flows between the sleeve and the tube by capillary action over the preheated brazing region until said ring of heat resistant material obstructs said flow, whereby a uniform layer of braze material is deposited between the brazing region defined by opposing edges of the ring of brazing material and the ring of heat resistant material.

22. A process for brazing a sleeve within a tube as defined in claim 21, wherein said ring of brazing material is formed from particles of a brazing alloy which have been bound onto the surface of the sleeve by a chemical binder.

23. A process for brazing a sleeve within a tube as defined in claim 21, wherein said ring of heat resistant material includes particles of a refractory material.

24. A process for brazing a sleeve within a tube as defined in claim 21, wherein said sleeve is formed from Inconel, and said heat source heats said first longitudinal section of said tube to a temperature of at at least 1800° F.

25. A process for brazing a sleeve within a tube as defined in claim 21, wherein said heat source is translated at a speed of between about one half to one inch per minute.

26. A process for brazing a sleeve within a tube as defined in claim 21, wherein said tube and sleeve are substantially vertically oriented, and wherein said ring of brazing material circumscribes the lower end of said sleeve, and wherein said first longitudinal section is located above said ring of brazing material.

27. A process for brazing a sleeve within a substantially vertically oriented conduit by means of a heat source which is capable of applying a pattern of heat across a selected longitudinal section of the conduit, wherein said sleeve includes an upper and lower brazing region, each of which includes a brazing material, comprising the steps of:

(a) heating a first longitudinal section of the conduit which is below and does not include the upper brazing region in order to thermally expand the conduit in this section;

(b) gradually moving the pattern of heat toward the brazing material of said upper brazing region in order to thermally induce radial expansion throughout a first length of the conduit between said first longitudinal section and the opposing edge of the upper brazing material, as well as to pre-heat the upper brazing region;

(c) applying said heat onto said upper brazing material so that said material melts and flows by gravity and capillary action over the pre-heated portion of the upper brazing region;

(d) heating a second longitudinal section of the conduit which is above and does not include the lower brazing region in order to thermally expand the conduit in this section;

(e) gradually moving the pattern of heat toward the brazing material of said upper brazing region in order to thermally induce radial expansion in second length of the conduit between said second longitudinal section and the opposing edge of the lower brazing material, as well as to pre-heat the lower brazing region, and (f) applying said heat onto the lower brazing material so that this material melts and flows against gravity by capillary action through a gap between said conduit and said sleeve in the lower brazing region, wherein the pattern of radial expansion induced in the conduit causes the gap to be diminished at every point between the first longitudinal section and the upper brazing material, and the second longitudinal section and the lower brazing material.

28. A process for brazing a sleeve within a conduit as defined in claim 27, wherein said sleeve is circumscribed by upper and lower rings of stop-off material spaced below and above said upper and lower brazing material, respectively, for confining the flow of braze material and for defining the lower and upper edges of the upper and lower brazing regions, respectively.

* * * * *